US008609739B2

(12) United States Patent
Zou et al.

(10) Patent No.: US 8,609,739 B2
(45) Date of Patent: Dec. 17, 2013

(54) POLY(PERFLUOROCYCLOBUTANE) IONOMER WITH PHOSPHONIC ACID GROUPS FOR HIGH TEMPERATURE FUEL CELLS

(75) Inventors: Lijun Zou, Rochester, NY (US); Timothy J. Fuller, Pittsford, NY (US); Michael R. Schoeneweiss, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 13/029,509

(22) Filed: Feb. 17, 2011

(65) Prior Publication Data
US 2012/0214882 A1 Aug. 23, 2012

(51) Int. Cl.
*C08G 79/04* (2006.01)

(52) U.S. Cl.
USPC ........... 521/27; 429/483; 525/326.2; 525/344

(58) Field of Classification Search
USPC .................. 521/27; 429/483; 525/326.2, 344
See application file for complete search history.

(56) References Cited

U.S. PATENT DOCUMENTS

| | | | |
|---|---|---|---|
| 5,006,408 A | 4/1991 | Green et al. | |
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,364,547 A * | 11/1994 | Babb et al. | 508/569 |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,444,343 B1 | 9/2002 | Prakash et al. | |
| 6,523,699 B1 | 2/2003 | Akita et al. | |
| 6,559,237 B1 * | 5/2003 | Mao et al. | 525/326.2 |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |

(Continued)

FOREIGN PATENT DOCUMENTS

JP 2003535929 T 12/2003
JP 2005129298 A 5/2005

(Continued)

OTHER PUBLICATIONS

Yu, S. et al., "Synthesis of Poly(2,2'-(1,4-phenylene) 5,5'-bibenzimidazole) (para-PBI) and Phosphoric Acid Doped Membrane for Fuel Cells," Fuel Cells 09, 2009. No. 4, pp. 318-324.

(Continued)

*Primary Examiner* — Peter D. Mulcahy
*Assistant Examiner* — Henry Hu
(74) *Attorney, Agent, or Firm* — Brooks Kushman P.C.

(57) ABSTRACT

A polymer for ion conductor applications includes a polymer segment having a perfluorocyclobutyl moiety and a phosphonated aryl group and a polymer segment a perfluorocyclobutyl moiety without phosphonated aryl group. The polymer is formed into an ion conducting membrane for fuel cell applications.

13 Claims, 4 Drawing Sheets

(56) References Cited

U.S. PATENT DOCUMENTS

| | | |
|---|---|---|
| 7,094,851 B2 | 8/2006 | Wu et al. |
| 7,332,530 B2 * | 2/2008 | Kiefer et al. .................. 521/27 |
| 2001/0018144 A1 | 8/2001 | Watakabe et al. |
| 2002/0014405 A1 | 2/2002 | Arcella et al. |
| 2003/0017379 A1 | 1/2003 | Menashi |
| 2004/0214058 A1 | 10/2004 | Tada et al. |
| 2004/0214065 A1 | 10/2004 | Kanaoka et al. |
| 2005/0014927 A1 | 1/2005 | Akita |
| 2005/0043487 A1 | 2/2005 | Felix et al. |
| 2005/0048342 A1 | 3/2005 | Wakahoi et al. |
| 2005/0053810 A1 | 3/2005 | Kato et al. |
| 2005/0058864 A1 | 3/2005 | Goebel |
| 2005/0064260 A1 | 3/2005 | Otsuki et al. |
| 2005/0100770 A1 | 5/2005 | Sugawara et al. |
| 2005/0106440 A1 | 5/2005 | Komiya |
| 2005/0116206 A1 | 6/2005 | Kakuta et al. |
| 2005/0130024 A1 | 6/2005 | Otsuki et al. |
| 2005/0142397 A1 | 6/2005 | Wakahoi et al. |
| 2005/0143530 A1 | 6/2005 | Iwadate et al. |
| 2005/0175886 A1 | 8/2005 | Fukuda et al. |
| 2005/0197467 A1 | 9/2005 | Komiya et al. |
| 2005/0227138 A1 | 10/2005 | Fukuda et al. |
| 2005/0233181 A1 | 10/2005 | Wariishi et al. |
| 2005/0260474 A1 | 11/2005 | Asano et al. |
| 2006/0019147 A1 | 1/2006 | Fukuda et al. |
| 2006/0127728 A1 | 6/2006 | Otsuki et al. |
| 2006/0177719 A1 | 8/2006 | Fuller et al. |
| 2007/0042242 A1 | 2/2007 | Tada et al. |
| 2007/0099054 A1 | 5/2007 | Fuller et al. |
| 2007/0141237 A1 | 6/2007 | Okiyama et al. |
| 2008/0027152 A1 | 1/2008 | Maier et al. |
| 2009/0278083 A1 | 11/2009 | Fuller et al. |
| 2011/0053036 A1 * | 3/2011 | Fuller et al. .................. 429/483 |

FOREIGN PATENT DOCUMENTS

| | | |
|---|---|---|
| JP | 2005166557 A | 6/2005 |
| JP | 2005179380 A | 7/2005 |
| JP | 2009249487 A | 10/2009 |
| WO | 2004/051776 | 6/2004 |
| WO | 2007/052954 A1 | 5/2007 |
| WO | WO-2007/052954 A1 * | 5/2007 |

OTHER PUBLICATIONS

Jayakody, J.R.P. et al., "MNR Studies of Mass Transport in High-Acid-Content Fuel Cell Membranes Based on Phosphoric Acid and Polybenzimidazole," J. of Electrochem., 154 (2), pp. B242-B246 (2007).

* cited by examiner

POLY(PERFLUOROCYCLOBUTANE) IONOMER WITH PHOSPHONIC ACID GROUPS FOR HIGH TEMPERATURE FUEL CELLS

TECHNICAL FIELD

The field to which the disclosure generally relates includes polymer electrolyte and fuel cells.

BACKGROUND

Polymer electrolytes play an important part in electrochemical devices such as batteries and fuel cells. To achieve optimal performance, the polymer electrolyte must maintain a high ionic conductivity and mechanical stability at both high and low relative humidity. The polymer electrolyte also needs to have excellent chemical stability for long product life and robustness. Random copolymers have been explored as electrolytes for fuel cells. Due to their inherent random chain configuration, however, random copolymers typically suffer from water swelling at high humidity and excess membrane shrinkage at low humidity. A random copolymer membrane lacks the mechanical robustness to withstand the rigors of hydration and dehydration within an operating fuel cell. Thus, there is a need for an improved polymer electrolyte that maintains robust mechanical properties and high ionic conductivity at wide range of humidity conditions.

Moreover, many of the polymeric electrolyte membranes used in automotive fuel cells lack sufficient high temperature performance or flame resistance. Each of these properties are particularly safety concerns for automotive application.

Accordingly, an improved polymer electrolyte molecular architecture and a process of synthesizing such a polymer electrolyte are desired.

SUMMARY OF THE INVENTION

The present invention solves one or more problems of the prior art by providing in at least one embodiment a method of making a polymeric membrane that includes a polymer having formula 1:

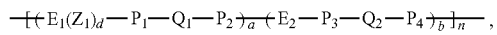  (1)

wherein:

$Z_1$ is —$PO_3H_2$;

$E_1$, $E_2$ is an aromatic or aliphatic-containing moiety wherein $E_1$ and $E_2$ include phenylene groups such that phenylene groups in $E_1$ are more active towards electrophilic substitution that phenylene groups in $E_2$;

a and b are each independently an integer greater than 10;

n is a number equal to or greater than 1;

d is an integer equal to the number of —$PO_3H_2$ attached to $E_1$;

$P_1$, $P_2$, $P_3$, $P_4$ are each independently absent, —O—, —S—, —SO—, —$SO_2$—, —CO—, —NH—, $NR_2$—, or —$R_3$—; and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene; and $Q_1$, $Q_2$ are each independently a fluorinated cyclobutyl moiety, the method comprising:

a) brominating a polymer having formula 2:

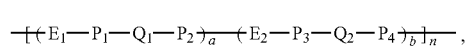  (2)

to form a polymer having formula 3:

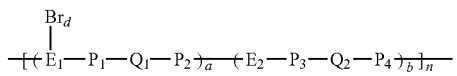  (3)

b) phosphonating the polymer having formula 3 to form a polymer having formula 4:

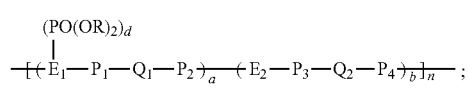  (4)

c) hydrolyzing the polymer having formula 4 to form the polymer having formula 1; and d) forming the polymer having formula 1 into a membrane for fuel cells. Advantageously, the polyelectrolyte membrane formed by the method of the present embodiment provide high-temperature performance in automotive hydrogen-air fuel cells. The amphoteric character of phosphonic acid allows a high proton conductivity in a low-humidity and at high temperature. Phosphorus-containing polymers are also flame retardant.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
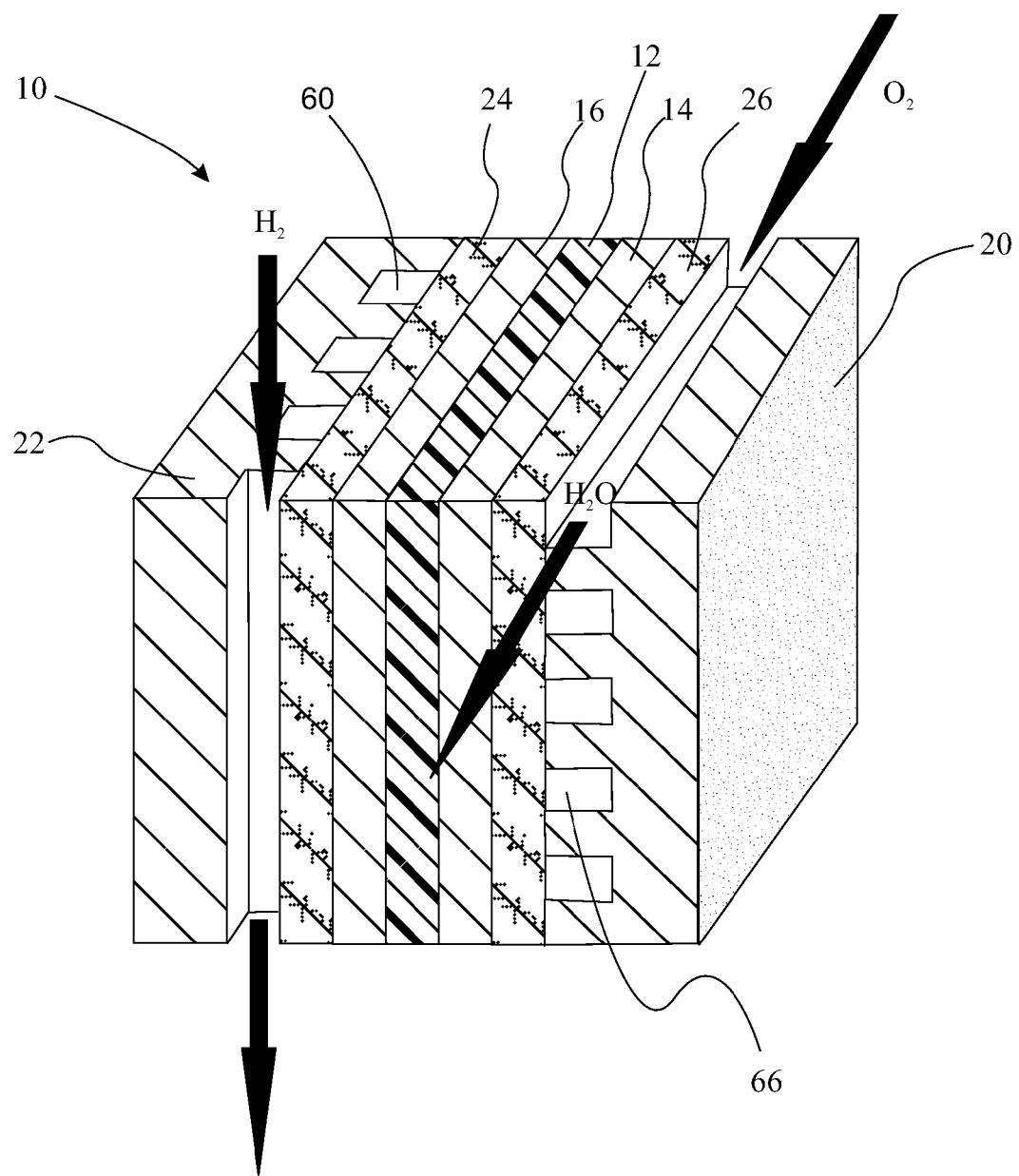
FIG. 1 provides a schematic illustration of a fuel cell incorporating the polymers of an embodiment of the present invention.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 60 and 66, and gas diffusion layers 24 and 26.

In an embodiment of the present invention, a method of forming a polymeric membrane that includes a polymer having formula 1:

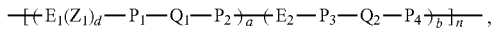

Figure 2:
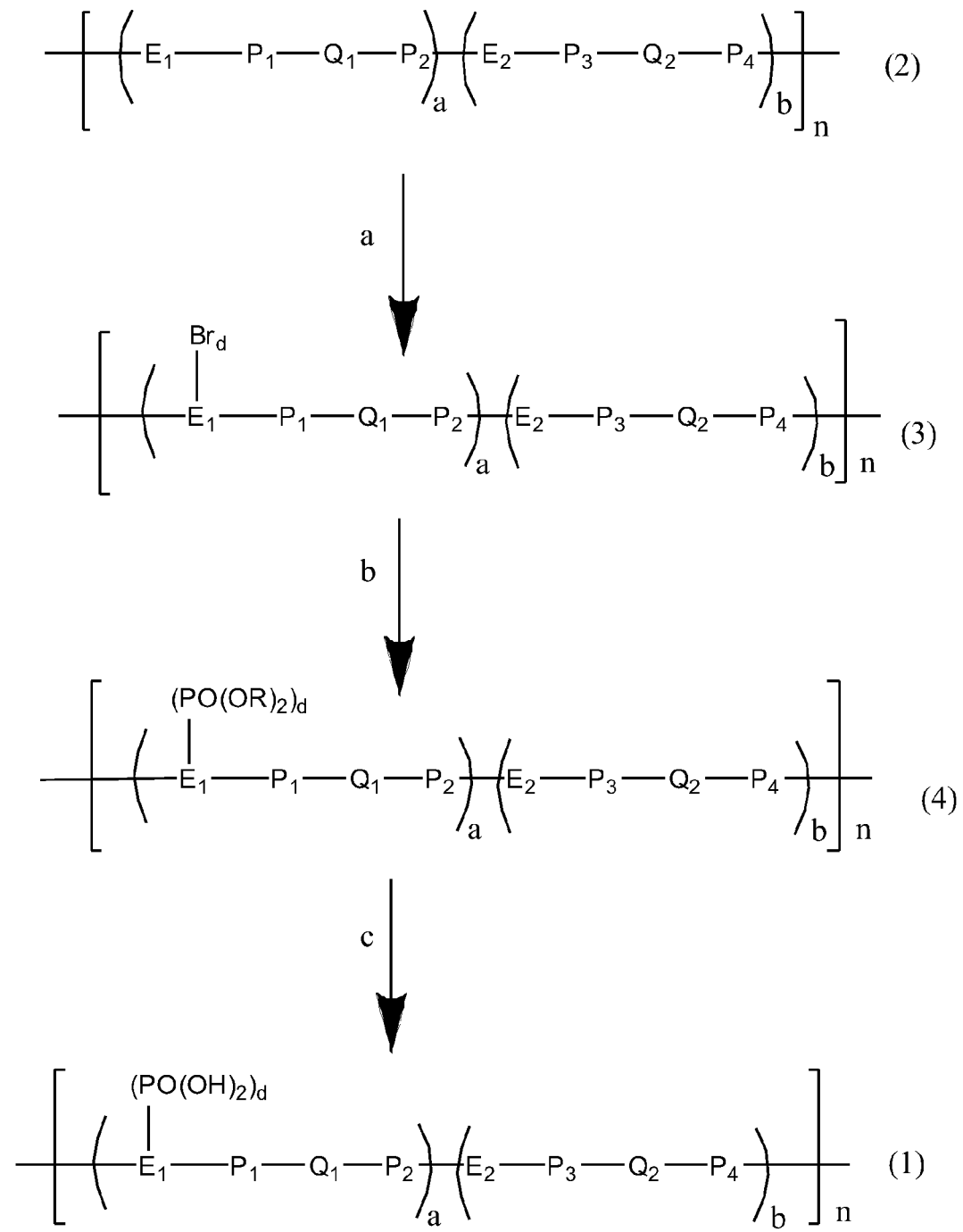
FIG. 2 provides a synthetic scheme for forming a polymer useful for forming an ion conducting membrane.

(1)

wherein:

$Z_1$ is $-PO_3H_2$;

$E_1$, $E_2$ is an aromatic or aliphatic-containing moiety wherein $E_1$ and $E_2$ include phenylene groups such that phenylene groups in $E_1$ are more active towards electrophilic substitution that phenylene groups in $E_2$;

a and b are each independently an integer greater than 10;

n is a number equal to or greater than 1;

d is an integer equal to the number of $-PO_3H_2$ attached to $E_1$;

$P_1$, $P_2$, $P_3$, $P_4$ are each independently absent, $-O-$, $-S-$, $-SO-$, $-SO_2-$, $-CO-$, $-NH-$, $NR_2-$, or $-R_3-$; and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene; and $Q_1$, $Q_2$ are each independently a fluorinated cyclobutyl moiety. The method of this embodiment is set forth in FIG. 2. The method comprises:

a) brominating a polymer having formula 2:

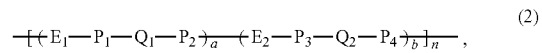

(2)

to form a polymer having formula 3:

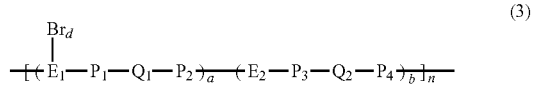

(3)

b) phosphonating the polymer having formula 3 to form a polymer having formula 4:

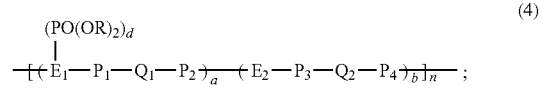

(4)

c) hydrolyzing the polymer having formula 4 to form the polymer having formula 1; and d) forming the polymer having formula 1 into a membrane for fuel cells.

In a variation of the present invention, $Q_1$, $Q_2$ are perfluorocyclobutyl moieties. Examples of perfluorocyclobutyl moieties include, but are not limited to:

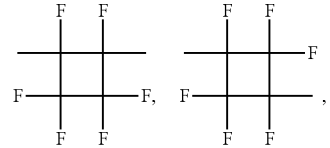

or a mixture thereof.

In step a) as set forth above, the polymer having formula 2 is brominated to form a polymer having formula 3. The bromination of polymer 2 is accomplished by reacting polymer 2 with a first reaction mixture including $Br_2$ in step a). Typically, the first reaction mixture further includes a Lewis Acid. Examples of Lewis Acids include, but are not limited to, $FeCl_3$, $FeBr_3$, Zn, and Fe. Fe is found to be particularly useful for this purpose.

In step b) as set forth above, the polymer having formula 3 is phosphonated to form a polymer having formula 4. Typically, this conversion is accomplished by reacting the polymer having formula 3 with a second reaction mixture that includes a compound having the formula $P(OR)_3$, where R is a $C_1$-$C_{10}$ alkyl group (e.g., methyl, ethyl, propyl, butyl, etc). Typically, the second reaction mixture includes $NiBr_2$.

In step c) as set forth above, the polymer having formula 4 is hydrolyzed to form the polymer having formula 1. Typically, this conversion is accomplished by reacting the polymer having formula 4 with a third reaction mixture that includes a bromotrimethylsilane. The third reaction mixture may also include $NiBr_2$. Alternatively, the hydrolyzation is accomplished by contacting the polymer having formula 4 with an aqueous acidic solution.

In step d), ion conducting membranes are formed from solutions of the polymer having formula 1. In one refinement, the membranes are cast from the polymer having formula 1. In another variation, a layer formed from the polymer having formula 1 is sandwiched between two PFSA layers to form a multilayer ion conducting membrane. In another variation, the polymer having formula 1 is blended with polyphosphoric acid. Polyphosphoric acid is found to hydrolyze in air or with water under fuel cell operating conditions to form a phosphoric acid proton conduction medium which is useful for high-temperature fuel cell operation. This phenomenon is demonstrated in the following references—Yu S et al., *Synthesis of Poly (2,2'-(1,4-phenylene)5,5'-bibenzimidazole) (para-PBI) and phosphoric Acid Doped Membrane for Fuel Cells*, FUEL CELLS Volume: 9 Issue 4 Special Issue: Sp. ISS. SI Pages: 318-324 (2009); and Jayakody, J. R. P. et al., *NMR studies of mass transport in high-acid-content fuel cell membranes based on phosphoric acid and polybenzimidazole*, Journal of the Electrochemical Society (2007), 154(2), B242-B246.

Figure 3:
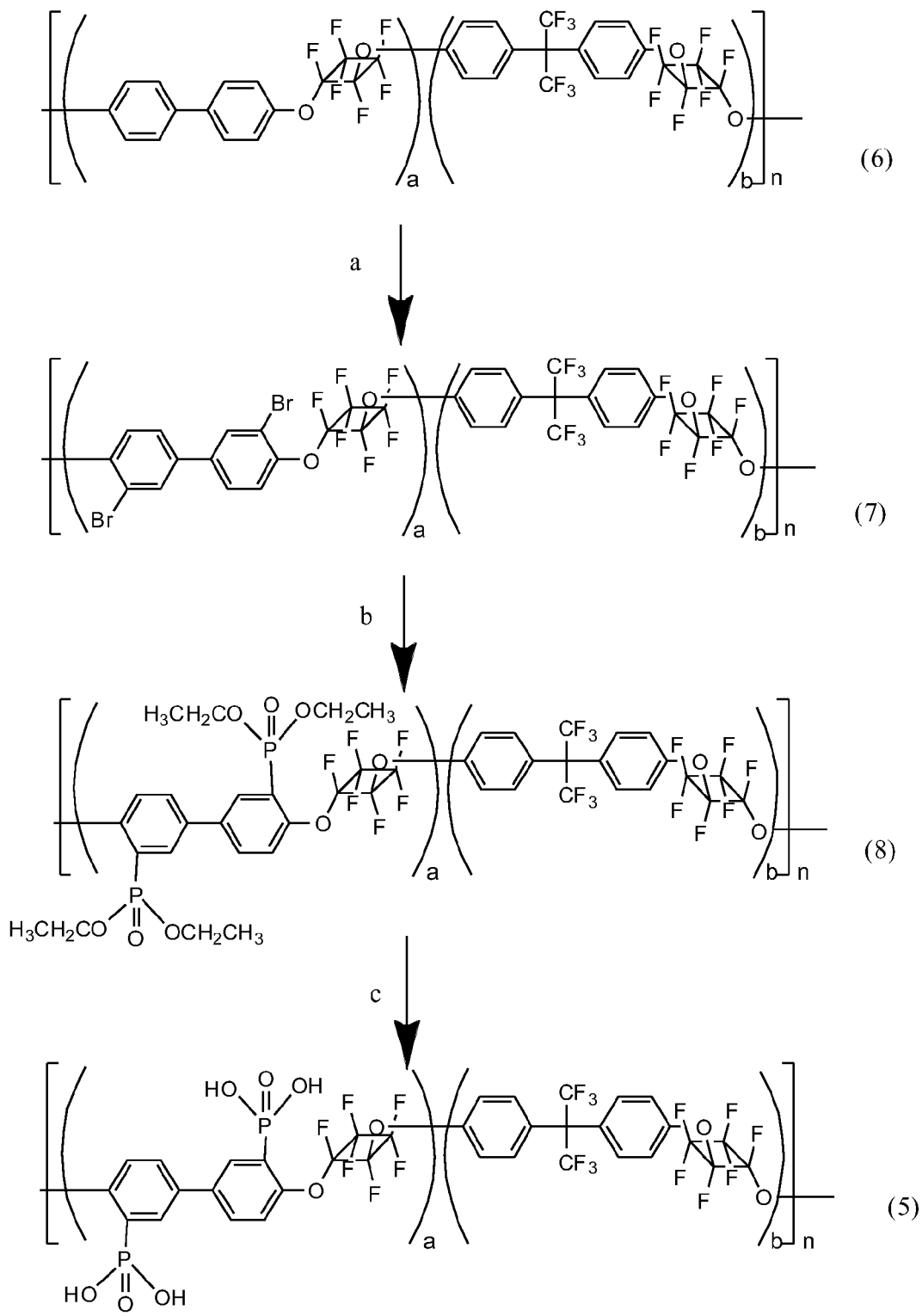
FIG. 3 provides a synthetic scheme for forming a polymer useful for forming an ion conducting membrane.

With reference to FIG. 3 a reaction scheme for forming a polymer having formula 5 is provided:

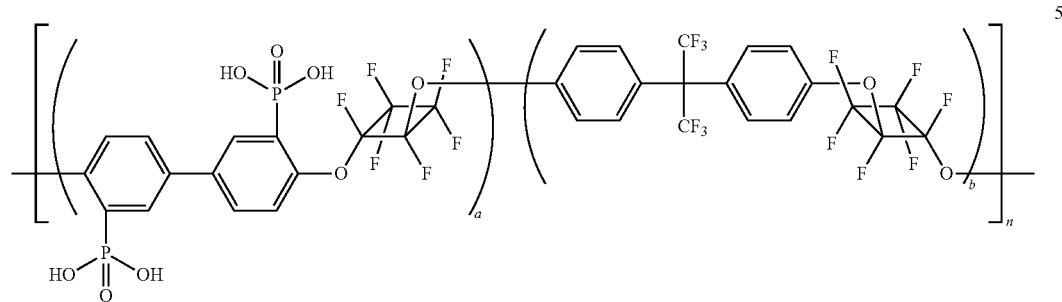

wherein:
  a and b are each independently an integer greater than 10;
  d is an integer from 1 to 4;
  n is a number equal to or greater than 1.

The method of this embodiment comprises a) brominating a polymer having formula 6 with a first reaction mixture including $Br_2$ to form a polymer having formula 7:

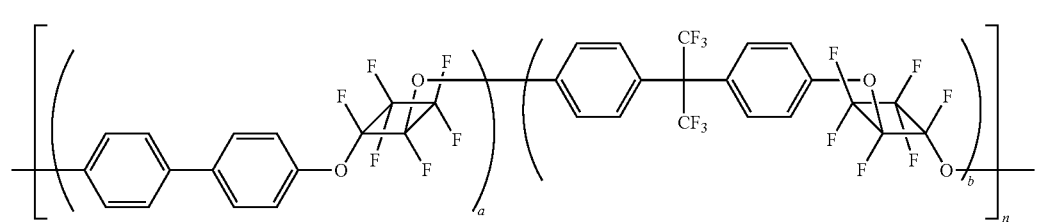

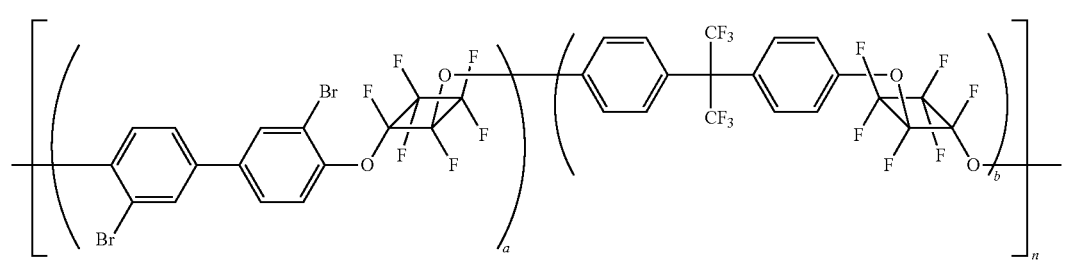

b) phosphonating the polymer having formula 7 with a second reaction mixture that includes a compound having the formula $P(OR)_3$ where R is a $C_1$-$C_{10}$ alkyl group (e.g., methyl, ethyl, propyl, butyl, etc) to form a polymer having formula 7:

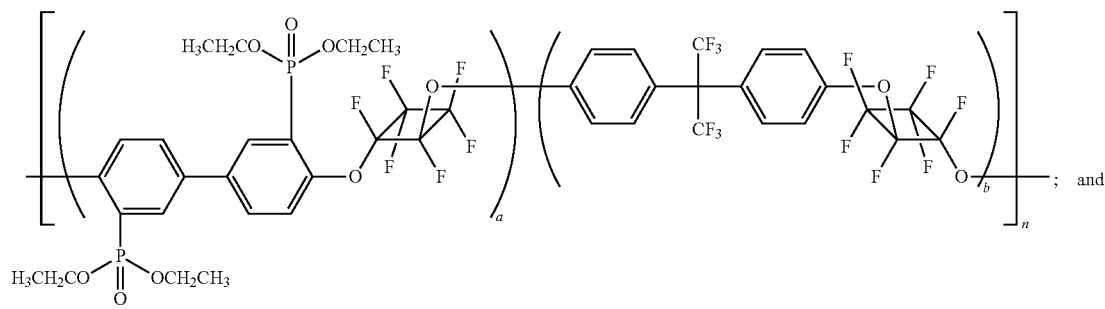

c) hydrolyzing the polymer having formula 8 with a third reaction mixture including bromotrimethylsilane to form the polymer having formula 5. As set forth above, the polymer having formula 5 is formed into an ion conducting layer for fuel cell applications.

The ionic conductivity of the polymers set forth above is determined by the concentration of phosphonic acid groups in the polymer molecule. Concentration of phosphonic acid group may be experimentally determined or calculated in terms of ion exchange capacity (IEC), in the unit of milliequivalent per gram (meq/g). IEC of a known polymer structure may be calculated by simply dividing the molar equivalent of phosphonic acid groups in a polymer molecule by the molecular weight of the polymer, and multiplying the result by 1000. For phosphonic acid polymers with unknown degree of phosphonylation, IEC can be determined experimentally. The experimental procedure for determining IEC of sulfonated polymers is fully described in U.S. Pat. No. 7,094,851, the entire disclosure of which is hereby incorporated by reference. Phosphonated polymers differ from sulfonated polymers in that there are two titratable acid groups per phosphonic acid group. By controlling the molar ratio of phosphonated/phosphonatable monomer to the un-phosphonated monomer and the degree of phosphonation, one can obtain an IEC of about 0.1 to about 8 meq/g for the phosphonated polymer. The polymer having an IEC of about 1 to about 4 meq/g exhibits high ionic conductivity and yet good mechanical properties at high relative humidity.

In another variation of the present embodiment, $E_1$ and $E_2$ include one or more aromatic rings. For example, $E_1$ and $E_2$, include one or more of:

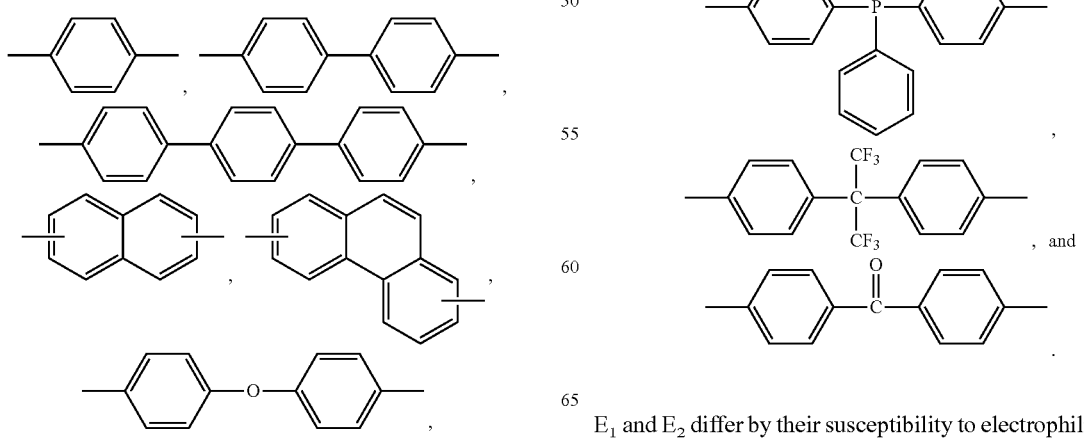

$E_1$ and $E_2$ differ by their susceptibility to electrophilic substitution. For example, groups with $CF_3$ groups will be less susceptible to electrophilic substitution than similar aromatic groups that are purely aromatic without any substituents. Electron donating groups are known to enhance the susceptibility of a phenylene group to electrophilic substitution while electron withdrawing groups decrease a phenylene group to electrophilic substitution. Examples of electron donating groups include, but are not limited to, —OH, Br, Cl, —OR, alkyl (e.g., $C_1$-$C_{10}$ alkyl), alkenyl (e.g., $C_2$-$C_{10}$ alkenyl), phenyl, and the like. Examples of electron donating groups include, but are not limited to, —OH, Br, Cl, —OR, alkyl (e.g., $C_1$-$C_{10}$ alkyl), phenyl, and the like.

In a variation, $E_1$ includes one or more of the following:

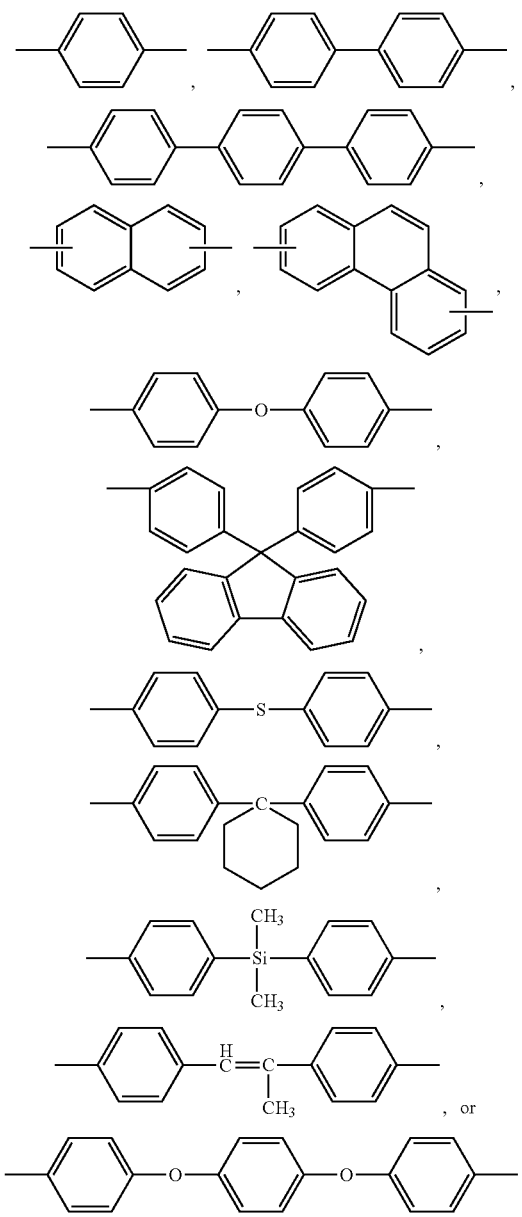

In this variation, these moieties may be unsubstituted or substituted with an electron donating group.

In another variation, $E_2$ includes one or more of the following:

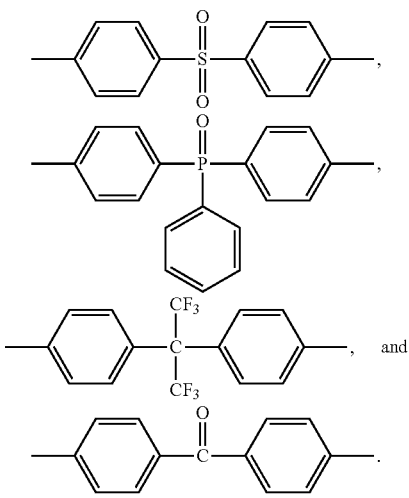

In this variation, these moieties may be unsubstituted or substituted with one or more electron withdrawing groups.

The following examples illustrate the various embodiments of the present invention. Those skilled in the art will recognize many variations that are within the spirit of the present invention and scope of the claims.

A. Phosphonation

A mixture of 20 ml anhydrous N-methyl-pyrrolidone and 70 ml diethylene glycol dimethyl ether are added into a 3-neck flask charged with brominated perfluorocyclobutane copolymer having formula 6 as shown in the of FIG. 3 (4.0 g) and anhydrous nickel bromide (0.66 g) under a nitrogen atmosphere equipped with a mechanical stirrer and a condenser. The temperature is raised to 155° C. and triethyl phosphite (6.0 g) is added dropwise over a period of 20-30 minutes at this temperature. After the addition of the triethyl phosphite is completed, the mixture is stirred for another 30 minutes and further anhydrous nickel bromide (0.5 g) is added and the solution is stirred for 24 hours at 155° C. Then the solution is allowed to cool down and poured into 1 L distilled water. The precipitated solid (3.5 g) having formula 7 as shown in FIG. 3 is washed with 1 L distilled water at 80° C., and then dried at 50° C. overnight.

B. Hydrolyzation

Phosphonated PFCB polymer (3.3 g) obtained from A) with formula 7 (FIG. 3) is added into a 3-neck flask charged with 150 ml anhydrous dichloromethane under nitrogen and equipped with a mechanical stirrer and a condenser. Then bromotrimethylsilane (8 mL) is added over a period of 20 minutes dropwise at room temperature to the mixture. After the addition is completed, the solution is stirred for another 40 minutes at room temperature and then heated for 1 hour at reflux (~55° C.). Then the solution is cooled down and concentrated to some extent by rotary evaporator and then poured into acetone. The precipitated solid is washed by acetone several times and dried at 50° C. overnight and then dissolved into methanol to prepare film casting solution. The IEC of the phosphonated PFCB is titrated as 2.84 meq/g.

C. Film Preparation and Acid Treatment

Phosphonated PFCB is cast into membranes from the methanol solution as a transparent film. Nafion® (DE2020 in n-propanol and water with ratio as 60:40, IEC=1.11 meq/g) is coated as thin layers of film on top and bottom (like skins) for the phosphonated PFCB. The skin sample is soaked in 2M $H_2SO_4$ aqueous solution at 50° C. for 1 hour and is denoted as an acid-treated skin sample.

Figure 4:
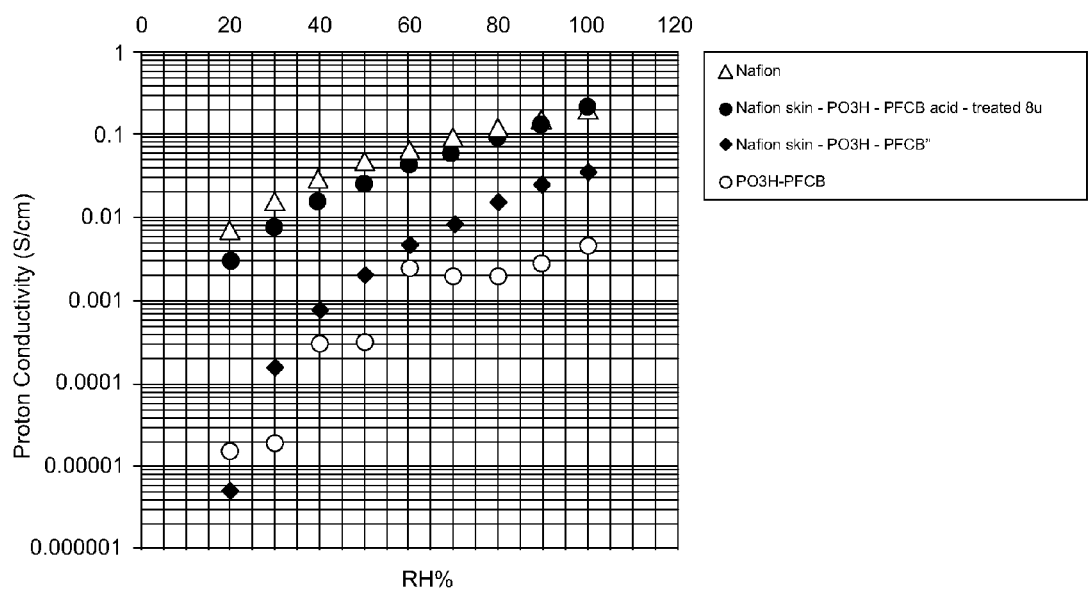
FIG. 4 is a plot of proton conductivity versus percent relative humidity for an embodiment of the present invention.

FIG. 4 shows the proton conductivity of phosphonated PFCB, phosphonated PFCB with Nafion® skins, acid treated phosphonated PFCB with Nafion® skins and Nafion® under different relative humidities at 80° C. Phosphonated PFCB shows relatively lower proton conductivity at 80° C. since phosphonic acid group tends to become more conductive (and deprotonate) at high temperatures, and 80° C. might not be high enough to see the advantage. The proton conductivity is improved by a Nafion® sandwich structure (designated a skin), and especially after acid treatment.

A fuel cell was assembled with carbon fiber diffusion media (Mitsubishi Rayon Corporation) and Pt on high surface area carbon black (Tanaka) with 0.05 mgPt/cm$^2$ anode and 0.2 mg Pt/cm$^2$ cathode as a loose lay assembly sandwiching the phosphonated membrane between electrodes having a Nafion DE2020 ionomer to carbon black ratio of 1.6 (wt./wt.). The active area was 38 cm$^2$ and the cell was operated at 95° C. under hydrogen anode/humidified air cathode with 2.3 Watts of power generation. Although operated as a polyelectrolyte membrane fuel cell, the system can also be operated as a phosphoric acid fuel cell by the addition of phosphoric acid electrolyte and with operation under hotter and drier conditions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming an ion conducting polymeric membrane for fuel cells, the polymeric membrane including a polymer having formula 1:

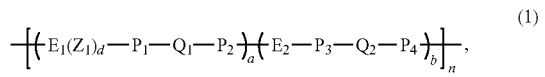

(1)

wherein:
$Z_1$ is —$PO_3H_2$;
$E_1$, $E_2$ is an aromatic or aliphatic-containing moiety wherein $E_1$ and $E_2$ include phenylene groups such that phenylene groups in $E_1$ are more active towards electrophilic substitution that phenylene groups in $E_2$;
a and b are each independently an integer greater than 10;
n is a number equal to or greater than 1;
d is an integer equal to the number of —$PO_3H_2$ attached to $E_1$;
$P_1$, $P_2$, $P_3$, $P_4$ are each independently absent, —O—, —S—, —SO—, —$SO_2$—, —CO—, —NH—, —N($R_2$)— or —$R_3$—; and
$R_2$ is $C_{1-25}$ alkyl or $C_{1-25}$ aryl;
$R_3$ is $C_{1-25}$ alkylene, $C_{1-25}$ perfluoroalkylene, perfluoroalkyl ether, alkyl ether, or $C_{1-25}$ arylene; and
$Q_1$, $Q_2$ are each independently a fluorinated cyclobutylene-moiety, the method comprising:
a) brominating a polymer having formula 2:

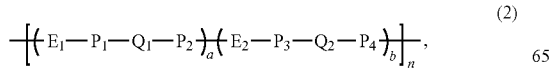

(2)

to form a polymer having formula 3:

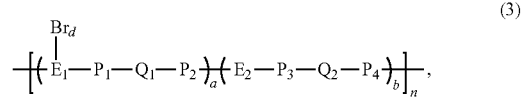

(3)

b) phosphonating the polymer having formula 3 with a compound having formula P(OR)$_3$ to form a polymer having formula (4):

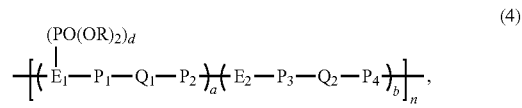

(4)

wherein R is $C_1$-$C_{10}$ alkyl and;
c) hydrolyzing the polymer having formula 4 to form the polymer having formula 1; and
d) forming polymer having formula 1 into a membrane for fuel cells.

2. The method of claim 1 wherein the polymer having formula 2 is reacted with a first reaction mixture including $Br_2$ is step a).

3. The method of claim 2 wherein the first reaction mixture further includes a Lewis Acid.

4. The method of claim 3 wherein the Lewis Acid is selected from the group consisting of $AlCl_3$, $FeCl_3$, $FeBr_3$, Zn, and Fe.

5. The method of claim 2 wherein the first reaction mixture further comprises Fe.

6. The method of claim 1 wherein the polymer having formula 3 is reacted with a second reaction mixture that includes a compound having the formula P(OR)$_3$ where R is a $C_1$-$C_{10}$ alkyl.

7. The method of claim 1 wherein the polymer having formula 4 is reacted with a third reaction mixture that includes bromotrimethylsilane.

8. The method of claim 1 wherein d is an integer from 1 to 4.

9. The method of claim 1 wherein a and b are each independently a number between 10 and 500.

10. The method of claim 1 wherein $E_1$ includes a moiety selected from the group consisting of:

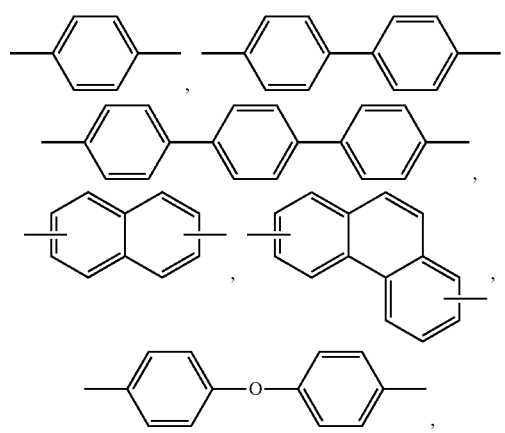

-continued

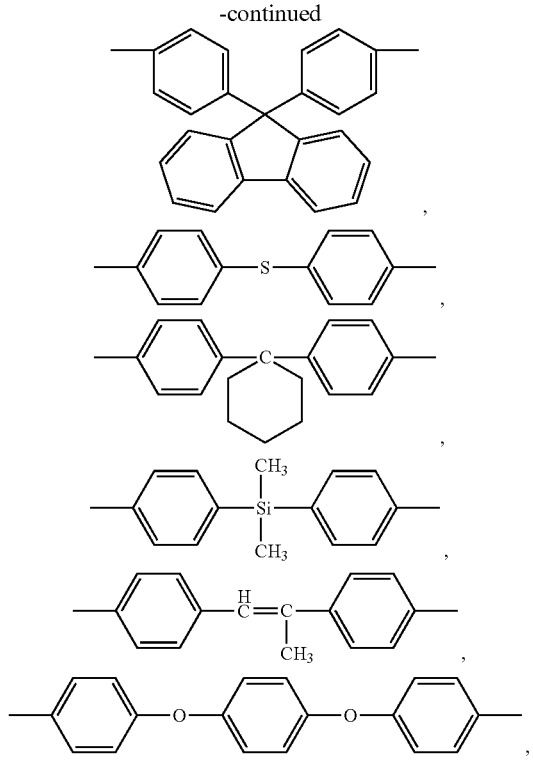

and combinations thereof, the moiety being unsubstituted or substituted with an electron donating group.

11. The method of claim 1 wherein $E_2$ includes a moiety selected from the group consisting of:

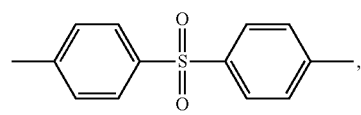

-continued

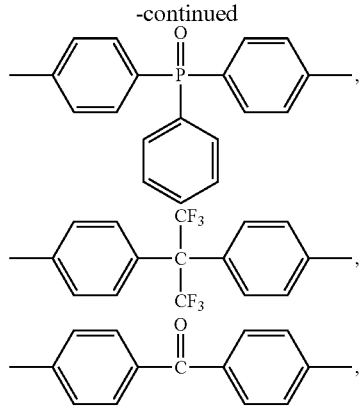

and combinations thereof, the moiety being unsubstituted or substituted with an electron withdrawing group or groups.

12. The method of claim 1 wherein $Q_1$ and $Q_2$ are each independently:

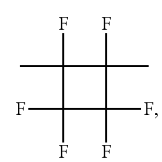 (5)

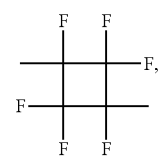 (6)

or combinations thereof.

13. The method of claim 1 wherein the polymer having formula 1 is blended with polyphosphoric acid.

* * * * *